US009795111B2

(12) United States Patent
Maier et al.

(10) Patent No.: US 9,795,111 B2
(45) Date of Patent: Oct. 24, 2017

(54) AUTOMATIC CLEANING SYSTEM AND METHOD FOR CLEANING/TREATING TEATS OF A DAIRY ANIMAL

(71) Applicants: Jakob Maier, Turkheim (DE); Wilfried Hatzack, Turkheim (DE)

(72) Inventors: Jakob Maier, Turkheim (DE); Wilfried Hatzack, Turkheim (DE)

( * ) Notice: Subject to any disclaimer, the term of this patent is extended or adjusted under 35 U.S.C. 154(b) by 0 days.

(21) Appl. No.: 14/425,942

(22) PCT Filed: Sep. 2, 2013

(86) PCT No.: PCT/EP2013/068061
§ 371 (c)(1),
(2) Date: Mar. 4, 2015

(87) PCT Pub. No.: WO2014/037295
PCT Pub. Date: Mar. 13, 2014

(65) Prior Publication Data
US 2015/0223424 A1     Aug. 13, 2015

(30) Foreign Application Priority Data
Sep. 5, 2012   (DE) .......................... 10 2012 215 751

(51) Int. Cl.
*A01K 29/00*    (2006.01)
*A01J 7/04*     (2006.01)
*A01J 5/007*    (2006.01)
*A01J 7/00*     (2006.01)

(52) U.S. Cl.
CPC ................. *A01J 7/04* (2013.01); *A01J 5/007* (2013.01); *A01J 7/00* (2013.01)

(58) Field of Classification Search
CPC ........ A01J 7/04; A01J 5/00; A01J 7/00; A01J 5/007; A01J 5/017; A01J 5/003; A01J 7/025; A01K 13/001; A01K 1/12
USPC .......... 119/14.08, 14.18, 650, 652, 654, 665, 119/670, 651, 14.02, 14.46, 14.04
See application file for complete search history.

(56) References Cited

U.S. PATENT DOCUMENTS

| 4,010,714 A | * | 3/1977 | Notsuki | ............... A01K 1/0613 119/14.03 |
| 5,211,132 A | * | 5/1993 | Farina | ....................... A01J 7/04 119/664 |
| 5,383,423 A | * | 1/1995 | van der Lely | ........... A01J 7/04 119/14.02 |

(Continued)

FOREIGN PATENT DOCUMENTS

| DE | 42 93 178 B4 | 10/1993 |
| DE | 36 50 755 T2 | 12/2001 |

(Continued)

OTHER PUBLICATIONS

German search report dated Jun. 27, 2013 in corresponding German Application No. 10 2012 215 751.4.

*Primary Examiner* — Jennifer E Novosad
(74) *Attorney, Agent, or Firm* — Fattibene and Fattibene LLC; Paul A. Fattibene (57) ABSTRACT

An automatic cleaning system for teats is designed to apply at least two different process fluids to the teats so that, in advantageous embodiments, a cleaning treatment can be performed in an automated manner before and after the milking process.

9 Claims, 5 Drawing Sheets

(56) References Cited

U.S. PATENT DOCUMENTS

| | | | | |
|---|---|---|---|---|
| 5,390,627 | A * | 2/1995 | van der Berg | A01J 5/0175 119/14.08 |
| 6,550,420 | B1 * | 4/2003 | Bjork | A01J 7/04 119/14.47 |
| 8,800,486 | B2 * | 8/2014 | Daniel | A01J 5/007 119/14.02 |
| 2005/0066904 | A1 | 3/2005 | Berg et al. | 119/14.08 |
| 2005/0274327 | A1 * | 12/2005 | Johnsson | A01J 7/04 119/670 |
| 2007/0186860 | A1 * | 8/2007 | Theodorus Dietrich | A01J 7/04 119/14.18 |
| 2007/0245964 | A1 | 10/2007 | Van Den Berg et al. | 119/14.08 |
| 2009/0145362 | A1 * | 6/2009 | Eriksson | A01J 5/0131 119/14.02 |
| 2012/0234355 | A1 * | 9/2012 | Van Den Berg | A01J 7/025 134/18 |
| 2013/0112142 | A1 * | 5/2013 | Harty, Sr. | A01J 5/0175 119/14.02 |
| 2015/0223424 | A1 * | 8/2015 | Maier | A01J 7/04 119/651 |

FOREIGN PATENT DOCUMENTS

| | | |
|---|---|---|
| DE | 101 60 161 | 6/2003 |
| DE | 10351549 | 6/2005 |
| DE | 602 10 198 T2 | 12/2006 |
| EP | 1 520 468 | 4/2005 |
| GB | 1 415 318 | 11/1975 |
| WO | WO 2011/098994 | 8/2011 |

* cited by examiner

AUTOMATIC CLEANING SYSTEM AND METHOD FOR CLEANING/TREATING TEATS OF A DAIRY ANIMAL

The present invention relates to the automated milking of dairy animals making use of a plurality of teat cups, and, in particular, cleaning and/or disinfection of the teats is carried out before the teat cups are applied and/or after they have been removed.

With the increasing globalization of the agricultural markets, the demands that have to be met by the producers of milk and milk products become increasingly higher. On the one hand, the milk must be produced at the lowest possible price with due regard to the international animal feed markets and the resultant commodity price fluctuations and, on the other hand, a high quality of the milk has to be guaranteed. In order to allow large quantities of milk to be produced in an agricultural enterprise, fully automatic or semiautomatic milking systems are used, so that a large number of animals can be milked with the least possible personnel. It is true that fully automated milking systems, so-called milking robots, offer the possibility of significantly reducing the number of workers required for producing the milk, since the entire milking process can, in principle, take place automatically. Nevertheless, the extremely high acquisition cost and the expenditure entailed by the maintenance of the fully automated system as well as the comparatively small operational capacity and the normally constantly necessary availability of the operating personnel for remedying malfunctions, which occur comparatively frequently, are important aspects under which the introduction of fully automated systems also in comparatively small and medium-sized agricultural enterprises seems to be disadvantageous. Therefore, many enterprises make use of semiautomatic milking systems, in which specific activities or at least specific monitoring functions as well as the temporal sequence of the entire milking process of the herd are executed under the control of the operating personnel. For example, the teat cups are often applied to the animals' teats by hand.

The milking process itself is normally carried out such that, by generating a certain amount of negative pressure in a teat cup, a flow of milk from the teat to the teat cup is initiated, the milk being then discharged from the teat cup into a suitable collection line. Since automatic and semiautomatic milking systems have been introduced in agricultural enterprises, great efforts have been made to guarantee the most efficient possible operation of milking systems, because for accomplishing a permanently high yield it is of the utmost importance to execute by means of the automatic milking system a milking process imitating the natural suction process of the calf on the udder of the mother animal. This means that, during an automated or semiautomated milking process, the operator should, on the one hand, intervene in the milking process only to a minor extent or not at all, so as to keep the percentage of labor costs in an agricultural enterprise low, and, on the other hand, the milking process should, in spite of the non-existing manual intervention on the part of the operator, be executed with a high degree of professional competence, so as to guarantee that the automated milking process will be highly "natural". It can be shown that, normally, a permanently high yield from dairy animals can only be guaranteed, when a high degree of milking-out is accomplished throughout the year, since the milk-producing cells, i.e. the alveoli, are then permanently stimulated to constantly produce large amounts of milk. To this end, it is normally necessary to observe certain physiological aspects, e.g. a sufficient stimulation, adequate pressure conditions at the teat and, in particular, a high degree of hygiene. Taking into account these aspects, the quantity and the quality of the milk can already be determined to a substantial degree by the milking process itself, irrespectively of other factors which additionally influence the physical and the psychological condition of the animals. This means that permanent udder health can be accomplished by optimally adapting the mechanical milking process to the physiological characteristics of the dairy animal, said permanent udder health being, in turn, the prerequisite for achieving a high yield of high-quality milk in the long run, and this guarantees, in the final analysis, also the economic success of a dairy enterprise. For example, a sufficiently high degree of milking-out and high hygienic standards are essential aspects not only for the total amount of milk produced but also for the quality of the milk, since, in the long run, especially the bacterial count of the milk can significantly be reduced through a milking process that has been optimized under these aspects.

In addition to the many purely physiological aspects, which have to be taken into account during mechanical milking, e.g. the stimulation, the pressure value of the vacuum, etc., also the hygienic preconditions are of decisive importance for the animal health and thus, ultimately, for the quality of the milk. For example, even in small and medium-sized agricultural enterprises, a large number of dairy animals is milked in succession with the same set of teat cups. Under these preconditions it is not only particularly important to observe the highest possible hygienic standards during a single milking process, by avoiding e.g. contact of the milk with animal excrements and the like, but also the spreading of germs from one animal to the next should be limited to the highest possible degree or prevented, so that a high level of animal health will be guaranteed also in the case of comparatively large live stocks. For example, the legislator issued in various countries respective regulations, which are embodied in a so-called milk regulation and which are intended to guarantee adequate hygienic standards. The observance of these hygienic standards is, however, not only important under the aspect of statutory provisions that are to be complied with, but, in the long run, it also leads to an improvement of animal health and consequently also to a higher yield of milk.

A prerequisite for high hygienic standards for each individual milking process is therefore an effective cleaning of the udder or at least of the teats of the animal before the teat cups are applied as well as an aftertreatment of the udder subsequent to the milking process, so as to reduce the amount of possible germs that may have been applied to the udder during the previously executed milking process, so that an ingress of possible germs into the teat canal, which is delicate after the milking process, is prevented as far as possible. Many fully automated systems try to take into account these hygienic aspects by cleaning the teats immediately prior to applying the teat cups, whereas an aftertreatment of the udder is executed in separate stations. In semiautomatic systems, where the teat cups are often applied manually, cleaning of the teats is carried out manually by the operator, the efficiency and the type of cleaning being here, however, substantially influenced by the individual attitude of the operator. Under serious time pressure, the cleaning phase may, for example, be cut short or even omitted completely and also the use of the respective cleaning agents may strongly vary according to the current situation in the enterprise in question.

In a similar way, also the cleaning carried out after the end of the milking process varies strongly due to the different circumstances prevailing in the respective dairy enterprises as well as due to the workload of the individual operator. A frequently occurring phenomenon is that a final aftertreatment, which, for the sake of simplicity, will also be referred to as cleaning or as dipping process hereinbelow, is completely omitted, since this process leads to a substantial increase in the effort required on the part of operating personnel, in particular when the number of animals to be milked is comparatively large. It follows that the efficiency and the duration of the respective cleaning processes before and after milking depend on the person in question, the conditions prevailing at the time in question, and the like. A permanently high quality and reliability of the respective cleaning processes may therefore not always be guaranteed, especially when a high workload and different qualifications of the trained personnel are involved.

Hence, there is a need to improve cleaning and disinfection or, quite generally, the treatment of the animal's udder before and/or after contact with the teat cups during automated or semiautomated milking processes in such a way that a high efficiency and a constant quality of the cleaning processes is achieved.

The present invention generally provides means with the aid of which the teats of a dairy animal are cleaned and treated in an at least partially automatic mode before and/or after the milking process, at least the application or the wetting, if it is necessary to apply a liquid process fluid, being executed automatically.

In particular, the present invention solves the abovementioned task by means of a cleaning system for teats of a dairy animal. The teat cleaning system comprises a fluid dispensing device, which is adapted to be attached to an animal accommodation area for accommodating the dairy animal before, during or after a milking process, and which is configured to dispense a first process fluid and a second process fluid separately of one another. Furthermore, the teat cleaning system comprises a positioning unit coupled to the fluid dispensing device and configured for positioning the fluid dispensing device such that the teats of the dairy animal are adapted to be acted upon at least partially by the first and the second process fluid.

Hence, the cleaning system according to the present invention is configured such that at least two process fluids, which are provided for different purposes in teat treatment and which will therefore normally have different compositions, can be applied automatically to relevant areas of the teat. Prior to carrying out the actual milking process and thus prior to applying the teat cups, it is important to clean the teats. To this end, a special cleaning fluid may be used, which will be water in the simplest case, whereas after the milking process the teats should be subjected to an aftertreatment which is intended to prevent further possible spreading of germs on the one hand and which, on the other hand, is carried out essentially for the purpose of teat care of the teats that were strained during the preceding milking process. For example, agents on the basis of lactic acid proved to be very useful for such aftertreatment. Hence, neither the presence nor the intervention of an operator is necessary, at least not for applying the respective process fluids, whereby, firstly, the entire milking process can be controlled more effectively as regards time, since the total attendance time of the operator can be reduced for each individual milking process in general, and, secondly, the entire amount of manual intervention in the milking process will be reduced. Another advantage achieved when the teats are automatically acted upon is that, during each cleaning process or treatment process, precisely defined amounts of the respective process fluid are applied, so that, on the one hand, it will be guaranteed that the quantity required for the respective cleaning or treatment is actually used, whereas, on the other hand, no wasting of process fluids will occur. Through the positioning unit, the teats are acted upon or wetted without coming directly into contact with the fluid dispensing device, so that a contamination of the fluid dispensing device will normally be avoided. In this way, a transfer of germs from one animal to the next is avoided to the greatest possible extent during the respective cleaning process.

According to a further advantageous embodiment, the fluid dispensing device comprises a first dispensing line which is connectable to a source for the first process fluid in a controlled manner, and a second dispensing line which is connectable to a source for the second process fluid in a controlled manner. This means that two separate dispensing lines are provided in the fluid dispensing device, so that the two process fluids can be dealt with separately during almost the entire discharge process. Mixing of the two process fluids is thus essentially avoided. According to advantageous embodiments, the fluid dispensing device is provided with a suitable valve unit for each of the separate dispensing lines, so that after the end of the dispensing process the dispensing line in question can be blocked fluidically, whereby an undesired escape of the respective process fluids can be avoided, e.g. during a change of the operating position of the fluid dispensing device. Furthermore, the fluid dispensing device includes a suitably configured end portion, e.g. in the form one or a plurality of outlet nozzles, so that the respective process fluid is ejected under well-defined conditions. To this end, each dispensing line may e.g. separately be provided with one or a plurality of outlet nozzles which are assigned thereto, so that mutual "contamination" of the process fluids will be avoided also in this area of the fluid dispensing device. According to other embodiments, the same outlet nozzle or a group of outlet nozzles are used in common for ejecting the first and the second process fluid, the possibly occurring slight mixing of the process fluid to be ejected with residues of the other process fluid being here normally negligible. A suitable device, e.g. a valve, for closing the dispensing line in question may here be provided in a respective nozzle or immediately upstream of said nozzle, so as to prevent, after the end of the discharge of a process fluid, further escape of the same during a change of position of the fluid dispensing device.

The dispensing lines additionally allow a controlled connection to a suitable source for the process fluids. This means that suitable devices in the form of valves and/or pumps and/or pressure reservoirs are provided, which allow the process fluid in question to enter the respective dispensing line in a controlled manner. The control of the supply of the respective process fluid to the dispensing line comprises, according to advantageous embodiments, the adjustment of precisely defined operating parameters, so that a dosed amount of the process fluid in question is fed into the respective dispensing line under well-defined pressure conditions. These operating parameters can here be specified such that also the conditions predetermined by the dispensing line and a possible outlet nozzle are taken into consideration, so as to guarantee well-defined conditions under which the teats are wetted, so that a desired cleaning and disinfecting effect is accomplished, without any process fluids being wasted.

According to another illustrative embodiment, the fluid dispensing device comprises a dispensing line which is connectable to a source for the first process fluid and a source for the second process fluid in a controlled manner. Hence, this embodiment allows to accomplish a more compact structural design of the fluid dispensing device by using the same dispensing line for two or more process fluids. In order to avoid mutual mixing of process fluids as far as possible, the controlled connection between the respective process fluid source and the dispensing line is, according to illustrative embodiments, configured such that, after the end of the ejection of the process fluid in question, the residues of these process fluid which are still present in the dispensing line are fed back into the respective container. For example, the controlled connection between the dispensing line and the process fluid source may be established by means of a suitable pump which acts in one direction for ejecting the process fluid in question, but acts in the opposite direction after the ejection of the process fluid, so that residues which may still be present in the dispensing line are conveyed back into the container. By way of example, a gear type pump can efficiently be operated in both directions, so that, by adequately controlling the gear type pump, the process fluid in question will be pumped into the dispensing line during discharge and will be sucked from the dispensing line and back into the associated container after the ejection process. In this way, mixing of the two process fluids is essentially avoided, whereas an undesired escape of the process fluids after the ejection process is simultaneously prevented to the greatest possible extent.

According to illustrative embodiments, the control of the connection between the dispensing line and the respective process fluid source can, irrespectively of whether a single dispensing line or a plurality of dispensing lines is provided, be effected such that, if necessary, the operating parameters are also dynamically variable, so that, where required, precisely defined conditions, which may, however, differ for the individual discharge processes, can be adjusted.

According to an advantageous embodiment, the first process fluid is used for application to the teats before the teat cups are applied and the second process fluid is used for application to the teats after the teat cups have been removed. In this case, the cleaning system according to the present invention can be used in two operational situations in which, especially in semiautomated enterprises, the presence and the intervention of an operator would otherwise be necessary. As has already been mentioned at the beginning, the observance of high hygienic standards is an essential precondition for complying with the statutory provisions for the production of milk on the one hand and for accomplishing a high economic efficiency of the enterprise on the other. An essential aspect is here the cleaning of the teats before the milking process, so that contaminations which may adhere to the teats will not come into contact with the interior of the teat cups and the teat rubbers as far as possible. Contaminations of the type in question typically result from contact of the teats with the floor or other objects, when the animal moves or rests in the stable or in the open air. Through the automated application of a dosed amount of the first process fluid, e.g. also tenacious dirt can be partially dissolved and softened, so that e.g. during a manual aftertreatment a much higher teat cleaning efficiency will be accomplished on the basis of a reduced expenditure of time on the part of the operator. In addition, when the teat is acted upon in an automated mode prior to the milking process, a higher degree of a precisely defined cleaning efficiency will be accomplished in comparison with fully manual cleaning processes, even though a certain amount of manual extra work is done subsequently.

It is, for example, often the case that especially in enterprises where work has to be done under serious time pressure, precleaning of the teats before the milking process is carried only very briefly or not at all and, if it is actually carried out, the same mechanical cleaning material is used for a large number of individual animals, so that it is neither possible to achieve the necessary hygienic standards for the respective individual milking process nor is it possible to prevent the transfer of germs from one animal to the next. Other than in these cases, the present invention at least allows the teats to be acted upon by the process fluid under well-defined process conditions, without establishing a direct contact between the fluid dispensing device and the teat, so that at least this transmission path for possible mutual contaminations is excluded. The defined application of the first process fluid additionally provides more advantageous conditions for a mechanical treatment that may be carried out afterwards, so that e.g. during mechanical rubbing off of partly dissolved contaminations a well-defined percentage of process fluid will be present, which can still be effective in the rubbed-off contamination so as to suppress a transfer of germs.

According to another advantageous embodiment, the cleaning process prior to the milking process may be executed exclusively automatically, as will exemplarily be described below in more detail.

Furthermore, the second process fluid is used in an advantageous manner for treating and disinfecting (dipping) the teats after the milking process, so as to avoid to the greatest possible extent an ingress of germs into the teat canal after the milking process, which has been terminated immediately before. Wetting of the teats after the milking process through the application of the second process fluid is here carried out automatically, so that, according to preferred embodiments, this phase of the milking process does not require manual intervention on the part of the operator. In particular, the animal in question can be discharged after the end of the milking process without further inspection on the part of the operator, provided that no abnormalities occurred during the preceding milking process. Also this contributes to an acceleration of the milking process in its entirety, without impairing the health of the udder. On the contrary, also in this case a high degree of efficiency of the aftertreatment can be achieved through accurately dosed teat wetting, without wasting any of the second process fluid.

According to an illustrative embodiment, the fluid dispensing device includes a dispensing arm, which is adapted to be positioned by the positioning unit at least at a first operating position, in which the dispensing arm allows access to the teats, and at least at a second operating position, in which the teats are adapted to be acted upon by the first and/or second process fluid. The use of a dispensing arm allows an efficient mechanical bridging of part of the distance between a process fluid source and the teats. Depending on the desired degree of positionability, an adequate mechanical coupling to the positioning unit ensures that the first and the at least one second operating position can be accessed in a controllable manner. In this context, the at least one second operating position is to be interpreted such that, at this position, all the teats of the animal in question can be wetted and acted upon. According to advantageous embodiments, also one second or a plurality of second positions can be accessed, possibly in the form of a continuous movement without special distinctive stopping positions, so as to allow a more advantageous distribution of the second process fluid for wetting the teats. By way of example, the phrase "at least one second operating position" comprises a continuous movement of the dispensing arm in the vicinity of the teats, during which the second process fluid is ejected in a continuous or non-interrupted manner, and this phrase also comprises the situation, in which several positions are accessed with short dwell times in the vicinity of the teats, so as to eject the second process fluid then at the respective position or eject the second process fluid continuously during the entire movement executed for accessing the individual positions. This phrase also comprises the situation, in which ejection of the process fluid takes place simultaneously at a plurality of different positions, e.g. when several differently positionable outlet nozzles are provided.

At the first operating position, the dispensing arm is positioned such that the accessibility of the teats is given, e.g. for applying teat cups, for removing teat cups, e.g. in an automated manner, for visual inspection by an operator, e.g. through an image pickup device, and the like. According to advantageous embodiments, the first operating position is configured such that contamination, e.g. by animal excrements, which may be excreted by the animal when it is present in the animal accommodation area, is essentially prevented. To this end, a suitable cover may e.g. be provided, which, although it does not impair the movement ability of the dispensing arm, offers nevertheless reliable protection against falling objects and tread loads. According to further embodiments, a suitable cleaning unit is additionally provided, which, if necessary or at regular intervals, cleans the outer surfaces of at least part of the fluid dispensing device, e.g. the dispensing arm, by spraying in a fluid, such as water, and the like.

According to another illustrative embodiment, the cleaning system is further configured to move the dispensing arm at least temporarily away from the second operating position, if a threshold value of a mechanical impact acting on the dispensing arm, which occupies the at least one second operating position, is exceeded. In this way, damage to the fluid dispensing device is prevented, when the latter is mechanically acted upon, e.g. by the animal present in the animal accommodation area. To this end, means which are known per se can be used in combination with the fluid dispensing device and/or the positioning unit, so that a change in position can be brought about in response to a mechanical impact. For example, a spring or a device that is mechanically equivalent thereto can be provided at a connection point which is mechanically movable per se, so that, due to the spring force, the desired position is assumed and maintained by activated drive means of the positioning unit, such as pneumatic cylinders, electric motors, etc., whereas a change of position can take place against the force of the spring when the mechanical threshold value is exceeded. According to other embodiments, this desired "mechanical yielding" of the fluid dispensing device in the at least one second operating position can be accomplished in that the drive means provided in the positioning unit are adequately controlled for effecting a change in position, when the mechanical threshold value is exceeded. For example, in the case of an electric motor, which, via a suitable mechanical coupling, is provided, at least partially, for positioning the fluid dispensing device, the occurrence of an additional moment of force can be detected and evaluated in a suitable manner, so that the electric motor will then be controlled in response thereto, thus causing a change of position so as to reduce the force acting from outside. According to other embodiments, this kind of mechanism, which causes a change of position for weakening a force acting from outside, may also be configured such that it is effective in other positions. A force acting from outside may, for example, also occur during the movement from the first operating position to the second operating position, so that also in this case adequate "mechanical yielding" established by passive and/or active mechanical means will prevent damage to the fluid dispensing device and/or the positioning unit to the greatest possible extent. This kind of mechanism may, for example, also be effective in the first operating position, or the first operating position is sufficiently protected by other mechanical means for preventing damage caused by an mechanical impact on the part of the animal.

According to another illustrative embodiment, the fluid dispensing device is further configured to dispense a third process fluid, which serves to reduce the surface wetting of a teat after the latter has been acted upon by the first or the second process fluid. This means that the third process fluid can be used for reducing the degree of wetting caused by the application of the first or the second process fluid, so that well-defined surface conditions are established on the teat for further treatment. The third process fluid may e.g. be provided in the form of a stream of gas, which leads to efficient drying of the teats. The third process fluid may here be supplied in such a way that the animal will not experience any unpleasant sensations that would be worth mentioning. For example, the temperature and the impact speed of a stream of gas may be controlled such that the animal will experience a pleasant sensation thus avoiding undesirable sudden movements or reactions of the animal.

Reducing the degree of wetting on the teat is e.g. particularly advantageous in a fully automated cleaning process immediately before the milking process, the first process fluid being here applied first for removing or at least partially dissolving and softening contaminations. The teats can then be acted upon by the third process fluid and, possibly, by one or a plurality of additional process fluids in such a way that, if necessary, partially dissolved contamination areas will be removed first, whereupon an efficient reduction of the wetting, i.e. drying, of the teats is accomplished. In this way, the teat cups can then be applied without causing a reduction of the surface adhesion of the teat rubber on the teat, as would be the case if the teats were wet. If the teat cups are applied manually by an operator, the teats may manually be acted upon very briefly, if necessary, so that possibly existing additional contamination particles will be rubbed off mechanically, without causing, however, any undesirable sensation of pain on the part of the animal. Since this short manual operation is carried out in an almost dry condition of the teat, also a possible transfer of germs from one animal to the next is strongly restricted, even if the respective cleaning cloth or other mechanical aids used by the operator are not exchanged between the individual animals.

Reducing the surface wetting through the third process fluid may also be advantageous in connection with the second process fluid, which is applied e.g. after the end of the milking process. By drying at least comparatively large areas of the teat, an undesirable adherence of contaminations can be avoided, when the animal moves away from the animal accommodation area.

According to further advantageous embodiments, the third process fluid and also additional process fluids can be provided in the form of other suitable liquids or gases, so that a high degree of flexibility can be accomplished for configuring suitable teat cleaning processes. According to illustrative embodiments, the third process fluid is discharged through an individual dispensing line, whereas in other cases a joint dispensing line or the dispensing line of some other process fluid is used. Also in this case, the previously used process fluid can be sucked off from a joint dispensing line, as has already been described above, so as to prevent the third process fluid from mixing with one of the other process fluids, if this should be necessary.

According to an advantageous embodiment, the cleaning system is configured such that it is applicable to the animal accommodation area provided for carrying out the milking process. This means that, according to this embodiment, the cleaning system is provided directly on the milking parlor, so that treatment and cleaning of the teats are carried out at the location at which also the milking process takes place and can thus be executed immediately before and/or immediately after the milking process. In this way, also a contamination of the udder, which may e.g. occur when the animal enters a milking parlor, will be removed during the respective cleaning process, a circumstance that is not given when treatment takes place in a separate animal accommodation area, since the animal then still has to move to the milking parlor in question. Hence, the critical process in which the teats come into contact with the teat cups takes place with teats that have been cleaned immediately before, e.g. through application of the first process fluid, possibly in combination with mechanical intervention on the part of the operator, so that a high hygienic standard can be accomplished. A corresponding treatment in a special animal accommodation area, which is not used for executing the milking process, always entails the risk that further contamination or soiling may subsequently occur on the way to the actual milking parlor. In a similar way, also the cleaning process or disinfecting process (dipping process) can be executed immediately after the removal of the teat cups, without it being previously necessary for the animal to cover the distance to a specially configured animal accommodation area, so that the highest possible efficiency will also be achieved in this case. This means that the second process fluid is applied immediately after the removal of the teat cups, without any impact of other contaminations being possible, and that also the teat-caring effect occurs immediately after the removal of the teat cups. Furthermore, installing the cleaning system according to the present invention directly on the milking parlor is advantageous insofar as the animal, after having been discharged from the milking parlor, need not undergo any further treatments, and this will in particular contribute to an improvement in animal traffic. In addition, separate animal accommodation areas for teat treatment are not necessary, whereby a more compact structural design of the stable can be realized. According to one embodiment, the cleaning system is installed on the automated milking equipment provided for the respective milking parlor. This allows the respective resources of the individual components to be used mutually in an advantageous manner. If, for example, the milking implement is pivotable, the pivoting mechanism can, due to the fact that the cleaning system is mechanically coupled to the milking equipment, also be used as part of the driving component of the cleaning system, so that the overall structural design will thus be simplified. Furthermore, already existing supply components of the milking equipment, such as pneumatic lines, water lines and the like can, if necessary, also be used for the cleaning system.

According to a preferred embodiment, the cleaning system further comprises a control unit that is configured to control the discharge of the first and second process fluids depending on a state of the animal accommodation area and/or the state of the animal to be milked and/or depending on animal-specific data of the animal to be milked and/or depending on a fed control signal and/or depending on current image data of the animal to be milked. According to this embodiment, the control unit is provided, which e.g. detects the status of the animal accommodation area or receives respective data characterizing this status. On the basis of the status ascertained therefrom, the control unit controls the cleaning system in such a way that the first and/or second process fluids are discharged as a result of the status ascertained. The status of the animal accommodation area, especially in cases where the latter corresponds to the milking parlor in which also the milking process takes place, may e.g. describe the current state of the milking parlor when the animal to be milked enters. In progressive enterprises where automated or semiautomated milking processes take place, intermediate disinfection of the teat cups is carried out between the individual milking processes, so as to comply with the legal provisions on the one hand and so as to maintain high standards as regards milk quality and animal health on the other. To this end, it is normally necessary to subject the teat cups to a suitable cleaning procedure, which requires the application of two or more cleaning agents and which also necessitates a certain exposure time, so that after the end of a preceding milking process it will be necessary to wait for a certain period of time before the teat cups are available for a further milking process. The time intervals which are here typically necessary are intervals of several 10 s. It follows that, with due regard to the current state of the milking parlor, e.g. the state of the teat cups, the control unit of the cleaning system according to the present invention is able to ascertain for the teats a suitable moment in time for starting the application of the first process fluid, when the next animal to be milked has entered the milking parlor. In other cases, e.g. the cleaning of the teats will also necessitate a mechanical treatment on the part of the operator, who may, however, not be on site or who may be unable to arrive at the respective animal accommodation area within a foreseeable period of time, so that in this case the control unit will ascertain, again on the basis of the status information, a suitable moment in time at which the respective process fluid should be applied to the teats. If, e.g. after the application of the first process fluid to the teats, a mechanical intervention on the part of the operator is immediately required for achieving the highest possible efficiency of the cleaning process, the control unit will trigger the discharge of the first process fluid only if the status information indicates that the operator is on site or will arrive within a short period of time, which can be adjusted in advance.

In other cleaning procedures, it may be necessary to wait until a certain exposure time has elapsed prior to executing a further treatment by the operator or through the cleaning system itself. In this case, the control unit may schedule the discharge of the respective process fluid such that unnecessary waiting times on the part of the operator at the respective animal accommodation area will be avoided. This may e.g. be accomplished in that the position of the operator is ascertained from the status information of the animal accommodation area or of other animal accommodation areas, so that it will be possible to calculate therefrom e.g. a minimum period of time which will be necessary for covering the distance between the current position of the operator and the position of the animal accommodation area in question. Furthermore, the control unit may, if necessary with due regard to the current position of the operator, transmit to the latter time information so as to specify a moment in time at which the operator's presence will be required. If it should not possible to observe this time limit due to the status of the operator, e.g. since the latter may be busy applying teat cups at an animal accommodation area that is far away, the control unit will be able to delay the discharge of the respective process fluid for a suitable period of time and to output a new desired moment in time for the presence of the operator.

In the case of fully automated cleaning of the teats prior to the milking process, the control unit will be able to schedule also this process depending on the current status of the animal accommodation area that is to be used for the milking process. This means that, when the cleaning system is e.g. provided on the milking parlor, the status of the teat cup intermediary disinfection can be evaluated by the control unit, so that a suitable moment in time for the fully automated cleaning process will be obtained, thus guaranteeing that the waiting time after the end of the cleaning process and the application of the teat cups will be as short as possible. As has already been explained hereinbefore, also the status of the operator may be evaluated to this end, if the latter is required for applying the teat cups. In other cases, in which the cleaning of the teats takes place in a separate animal accommodation area prior to the milking process, the control unit can ascertain the status of the animal accommodation areas, which are available for a subsequent milking process, so that it will then be possible to specify from the status data of the animal accommodation areas a suitable moment in time for applying the respective process fluid to the teats.

Alternatively or additionally, the control unit is also configured such that also the status of the animal to be milked or of the animal that has already been milked is ascertained or received and evaluated, so as to cause the discharge of the first and/or the second process fluid. The status of the animal to be treated at the time in question may e.g. contain information indicating whether a particularly intensive exposure to the first and/or the second process fluid is necessary in view of the current health situation of the animal, the current degree of contamination, and the like. The status of the animal to be treated at the time in question may here describe a current state of the animal, which is e.g. not or not yet comprised in the relevant animal-specific data, so that a very dynamic adaptation of the discharge of the first and/or second process fluids will be possible by evaluating the status through the control unit.

Alternatively or additionally to the evaluation of the above indicated status information with respect to the animal accommodation area, the operator, the animal to be milked or the animal that has already been milked, the control unit also uses animal-specific data for suitably controlling the discharge of the process fluids. The animal-specific data are fed to the control unit, e.g. from a superordinate control system controlling the animal traffic or the animal management in general, or relevant animal-specific data are requested by the control unit as soon as the identity of the animal to be treated is known. The animal to be treated is identified e.g. by a suitable animal recognition system, which communicates with a superordinate control system or the control unit and is thus able to provide the necessary information for the control unit. The animal-specific information related to animal recognition will then be evaluated, if necessary, e.g. with respect to a possible dosage of a process fluid, with respect to a distribution of the process fluid on the basis of the individual udder shape and udder size, and the like. Furthermore, the animal-specific data may also comprise the animal's response to the treatment, so that it will thus also be possible to control through the control unit the intensity of the treatment, e.g. in the form of the discharge amount and the period of time.

Additionally or alternatively to the above mentioned information, which can be evaluated by the control unit for controlling the discharge of the process fluids, the control unit is also configured for evaluating one or a plurality of fed control signals for discharging the process fluids. By way of example, a fed control signal may be a signal, which has been transmitted by an operator through telecommunication or through direct input at the cleaning system and which is used for controlling the discharge of the process fluids through the control unit.

Furthermore, the control unit is, alternatively or additionally to the above described embodiments, configured to record or receive image data and to evaluate them for producing thus information for controlling the process fluids. To this end, one or a plurality of image pickup devices, which produce image data, may be installed at a suitable location within the area in which animal traffic takes place. For example, the area of the udder of an animal to be treated may be imaged through the image pickup device. An evaluation with respect to the degree of contamination can then be executed by the control unit or by a subsequent image processing unit. To this end, easily recognizable features may possibly be recognized in an adequate algorithm for differentiating e.g. between an "extreme" contamination, which necessitates a special type of udder treatment, and a "normal" contamination. The determination of suitable distinguishing features and the implementation into adequate algorithms, e.g. edge detection algorithms, the recognition of areas exhibiting strongly different colors, etc., may here be based on known well-established image processing procedures.

The recording of image data and their provision and processing can also be used for ascertaining the identity of an animal to be treated, automated image recognition algorithms being used also in this case. If necessary, unique marks may be provided at suitable positions on the animal, e.g. in the form of a figure, which is painted on or printed on in some other way, an earmark, which is attached to each animal anyhow, and the like.

According to another advantageous embodiment, the control unit is further configured to cause the positioning unit to access the at least one second operating position while evaluating the image data of the animal to be milked or the milked animal and/or while making use of position data of the animal to be milked or the milked animal in the animal accommodation area and/or while making use the animal-specific data.

Making use of the image data of the animal to be milked or the milked animal, which is the next animal to be treated with the first and/or the second process fluid, it is possible to guarantee a very efficient control of the positioning unit by the control unit. For example, the image data may be recorded such that the position of the animal to be treated can, with respect to the animal accommodation area, be extracted from the image data through suitable image processing procedures, so as to guarantee thus a more precise determination of the second operating position. By way of example, an image pickup device is positioned such that, in the relevant animal accommodation area, at least the udder of the animal is shown in relation to at least part of the animal accommodation area, so that, making use of well-known image processing algorithms, the position of the udder in relation to the animal accommodation area and consequently also in relation to the cleaning system can be ascertained. Due to the precise determination of the one or several second operating positions on the basis of the image data, the control unit will not only be able to cause the positioning unit to access the previously precisely ascertained positions, but these positions can also be determined such that it will suffice to discharge a minimum amount of process fluid, a required effect being, however, nevertheless guaranteed. If necessary, the image data may also adequately be evaluated after the end of the discharge or during the discharge, so as to determine the success of the positioning and of the process parameters used by the control unit, e.g. the pressure of the process fluid during discharge. If, for example, after the end of the discharge of a process fluid, the image evaluation executed does not show that a desired degree of wetting has been accomplished, the control unit may adequately vary one or a plurality of process parameters. To this end, parameters values assigned to a plurality of evaluation results of the image processing, e.g. parameter values for the pressure, the quantity, and the like of the respective process fluid, may be stored in a table, so as to accomplish the desired wetting during the next discharge or during a repetition of the discharge.

According to another variant, the control unit is configured to evaluate, additionally or alternatively to the use of image data, other position data indicating the position of the animal to be treated. By way of example, the fluid dispensing device may comprise adequate means for determining the position of the animal within the animal accommodation area, e.g. in the form of light barriers, capacitive proximity sensors, proximity sensors operating on the basis of electromagnetic radiation, ultrasonic sensors, and the like. According to other embodiments, the relevant position sensors may be provided independently of the fluid dispensing device, so as to control e.g. the animal traffic and/or the milking process on the basis of acquired position data. In this case, at least a relevant part of the position data, which corresponds to the position of the animal to be treated in the relevant animal accommodation area, is fed to the control unit, which is capable of directly utilizing or adequately processing these position data for generating therefrom suitable coordinates for controlling the positioning unit. The position data may e.g. essentially indicate the size, the shape and roughly the position of the animal in question, so that on the basis of this information suitable positions can be calculated for the fluid dispensing device. In this way, a distinctly incorrect discharge of the process fluids will be avoided.

According to other embodiments, the control unit uses animal-specific data, alternatively or additionally to the image data and/or the position data, for determining the one or the plurality of second operating positions or for improving the accuracy of the latter. The animal-specific data may e.g. comprise information on the physiological characteristics of the animal in question, which, in turn, may be used for generating more precise coordinates for the positioning unit. According to one embodiment, especially the positions of the udder and/or of the individual teats are encoded in the animal-specific data, so that they can be used or extracted by the control unit, when suitable target coordinates are calculated for the fluid dispensing device. The animal-specific data may e.g. refer to an animal-internal reference system, which, in turn, may be specified through additional position data and/or image data with respect to the animal accommodation area. For example, image processing on the basis of image data comprising a suitable reference point, e.g. a distinctive mark, or the like, may correlate this reference point with the animal accommodation area, so that, taking as a basis the reference ascertained through the image data and taking into consideration the animal-specific data, the control unit will also be able to ascertain precise information on the position of the udder and of the teats. For example, an adequately distinctive reference point may be applied at a suitable point of the animal, e.g. its back, so that the image pickup device used for generating the image data can be arranged at a location above the animal accommodation area, it being thus almost impossible that the image pickup device gets contaminated or damaged during operation. It goes without saying that reference signs of the kind in question may also be provided on the animal at other points, so that the relevant image pickup device should be provided in a suitable manner such that it will be possible to extract from the image data these reference signs in connection with distinctive regions of the animal accommodation area.

The animal-specific data can also be utilized with other types of position data, which are acquired by other sensors, as has been described hereinbefore. For example, making use of a suitable arrangement comprising only a small number of light barriers or using one or a small number of other sensors, the position of the animal in its entirety can be determined comparatively precisely in relation to the animal accommodation area, whereupon the animal-specific data are used for extracting therefrom more precise coordinates for the udder and the teats.

According to a further aspect of the present invention, the task is solved by a method for cleaning and/or treating a teat of a dairy animal. Said method comprises the steps of wetting the teats for the first time with a first process fluid in that a fluid dispensing device, which positions itself by moving from a first operating position to at least one second operating position, ejects the first process fluid at said second operating position. Subsequently, the first operating position is accessed with the fluid dispensing device and teat cups are applied for carrying out a milking process. Finally, the teats are wetted for the second time with a second process fluid after the end of the milking process by accessing the at least one second operating position with the fluid dispensing device.

It follows that in the method according to the present invention a sequence of steps is executed, in the course of which, making use of the automatic cleaning system, the teats are cleaned before the milking process and the teats are cleaned and/or treated after the milking process.

According to an advantageous embodiment, the first wetting and the second wetting are carried out without any change of position of the dairy animal, so that, especially with respect to the application of the second process fluid, an effect of the second process fluid is obtained, which starts immediately after the removal of the teat cups.

According to another advantageous embodiment, the first and/or second wetting takes place at the at least one second operating position such that a plurality of positions are accessed and/or a continuous movement is carried out during the discharge of the first or second process fluid. Precise and sufficient wetting of the teats can thus be accomplished. For example, a continuous movement in the vicinity of the teat can be achieved through a mechanical cam disk or a cam profile, whereby a high reproducibility of the sequence of motions is guaranteed on the basis of a simple structural design.

According to an advantageous embodiment, the method comprises the use of position data of the dairy animal for accessing the at least one second operating position and/or for discharging the first or second process fluid at the at least one second operating position. As has already been explained herein before, suitable position data can be acquired through the cleaning system itself or through other adequate available sensors and can be evaluated in a suitable manner for demanding on the basis of these data the one or the plurality of second operating positions, or for creating a suitable continuous path in the vicinity of the teats. In addition, the first or the second process fluid can be discharged on the basis of the positioning data in such a way that a desired sufficient wetting of all teats is accomplished with the smallest possible amount of process fluids to be discharged.

According to another advantageous embodiment, the method comprises the use of animal-specific data for accessing the at least one second operating position and/or for discharging the first or second process fluid at the at least one second operating position. It follows that, in addition or alternatively to the use of position data, also the use of animal-specific data can be utilized for increasing the efficiency of the entire cleaning process or of the treatment of the teats. The respective animal-specific data and may e.g. comprise information on physiological characteristics of the teats, so that the positioning of the fluid dispensing device at the at least one second operating position can be optimized in this way.

According to another illustrative embodiment, the method comprises the step of applying a third process fluid to the teats at the at least one second operating position, so that also more complex cleaning processes or treatments can be carried out.

In particular, according to an illustrative embodiment, the third process fluid serves to reduce the wetting of the teats that have previously been wetted with the first or second process fluid. It is thus possible to accomplish or at least accelerate drying, so that the teats will be available for further treatment more quickly. It may, for example, be advantageous to carry out a drying process prior to applying the teat cups.

According to an advantageous embodiment, at least the second process fluid is suitable for use in an aftertreatment of the teat after the milking process. As has already been explained, the teats are delicate especially after the strain caused by the milking process and should be acted upon by an agent having a teat-caring effect as well as a disinfecting effect to a certain extent. In this way, the automated milking process can be adapted even better to the natural suction process of the calf, in which in the end phase of the suction process a teat-caring and disinfecting effect is achieved by a change in the suction process and a change in the composition of the milk. For example, lactic-acid-based agents may be used for this purpose.

Further advantageous embodiments, tasks and advantages of the present invention can be inferred from the additional detailed description as well as from the enclosed claims.

Other illustrative embodiments are now described in more detail making reference to the accompanying drawings, in which.

Figure 1A:
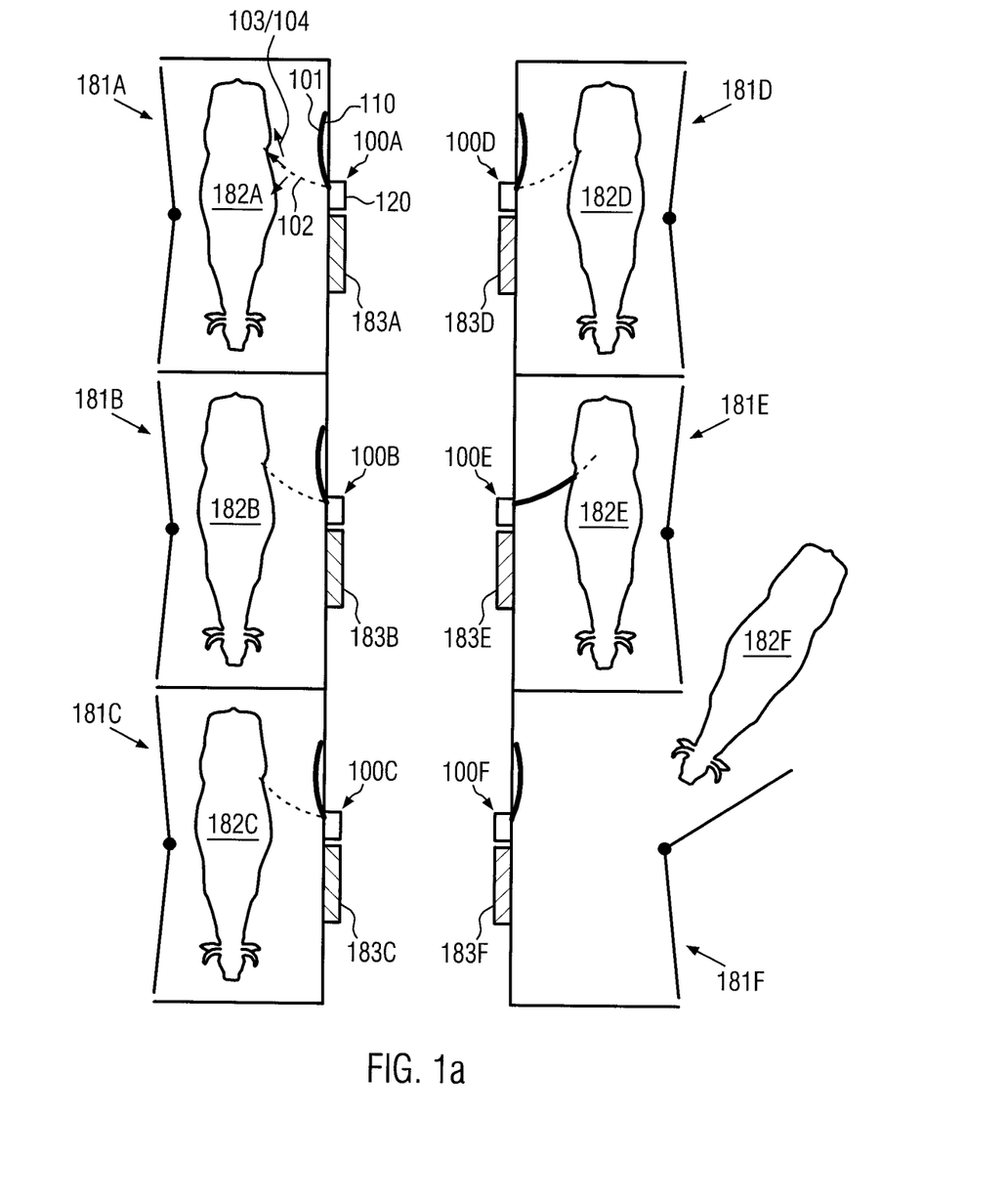
FIG. 1a shows a schematic top view of an area of a milk-producing enterprise, where a plurality of animal accommodation areas in the form of milking parlors are provided for allowing an efficient milking process for a plurality of animals, making use of the cleaning system according to the present invention.

FIG. 1a shows schematically a top view of an operational environment 180 of a milk-producing enterprise, in which especially cows but also other dairy animals are managed, in particular as regards milking, such that the highest possible operational capacity can be accomplished with little personnel expenditure and a high yield. In the embodiment shown, various animal accommodation areas 181A, . . . , 181F are shown in a suitable arrangement for milking a plurality of animals 182A, . . . , 182F in parallel. In the variant shown, the animal accommodation areas 181A, . . . , 181F are provided in a double-row linear arrangement, which allows an operator to move between the two rows. This arrangement is also known as auto tandem.

It should, however, be taken into account that the present invention is not limited to a special arrangement of the animal accommodation areas. In particular, the teat cleaning system according to the present invention may also be used in a milking parlor arrangement, which is generally known as herringbone arrangement and in which a plurality of milking parlors is provided in the form of an oblique array. The milk-producing industry also makes use of so-called rotary milking assemblies, in which a plurality of milking parlors is installed on a rotating platform, said milking parlors being then filled with the animals in question. Also in these milking parlors the cleaning system according to the present invention can be used efficiently.

In the advantageous embodiment shown in FIG. 1a, the areas 181A, . . . , 181F are therefore milking parlors in which a milking process can be executed with the aid of a suitable automated or semi-automated milking equipment, schematically shown as 183A, . . . , 183F. In said milking process at least milk extraction takes place automatically. In addition, each animal accommodation area has provided therein a respective cleaning system 100A, . . . , 100F, so that an automated discharge of the first and/or second process fluid can take place in each animal accommodation area, said automated discharge taking place immediately before and/or immediately after a milking process, without any change of position of the animal in question being necessary. Thus, an increase in the efficiency of maintaining the animals' health and the quality of the milk can be accomplished, if necessary, while the whole milking process and animal traffic can simultaneously be controlled with due regard to the automated discharge of the process fluids.

The cleaning systems 100A, . . . , 100F are each provided with a positioning unit 120, which is configured to be suitable for positioning a fluid dispensing device 110 such that the process fluids can accurately be discharged while avoiding interference with the other sequences of operations in the respective animal accommodation area. To this end, the positioning unit 120 is e.g. configured to move the fluid dispensing device 110 to a first operating position 101 and to retain it there, the necessary accessibility to the udder of the respective animal being given for the operator or for an automated device of the milking equipment at this operating position. Furthermore, the positioning unit 120 is configured such that the fluid dispensing device 110 can be moved to at least one second operating position 102, at which the udder or teats of the animal can have applied thereto the respective process fluid. It should here be pointed out that also a plurality of second operating positions, identified as 103/104, can be accessed, if this should be suitable for discharging the process fluids more accurately. In particular, the at least one second operating position may also comprise a continuously varying position, the respective process fluid being then discharged continuously or step-by-step, as has already been explained hereinbefore. A high degree of flexibility in designing the milking process and especially in the pretreatment and/or aftertreatment of animals is accomplished in that the cleaning system is capable of discharging at least two different process fluids in a controlled manner.

Figure 1B:
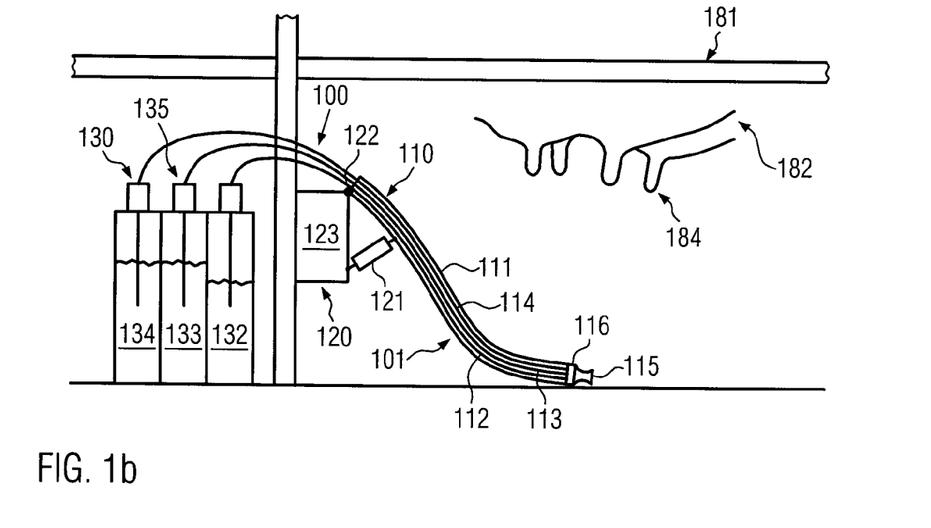
FIG. 1b shows schematically a side view of an individual milking parlor, in which the cleaning system for the teats is shown at a first operating position.

FIG. 1b shows schematically a side view of an animal accommodation area, which is designated by 181 and in which an animal 182 is present whose teats 184 are to be acted upon and wetted, respectively, by a first process fluid 132 and a second process fluid 133 within the area 181 at a suitable moment in time. As has been explained hereinbefore, the animal accommodation area 181 is, in advantageous embodiments, a milking parlor, in which a milking process is actually carried out, a respective milking equipment being not shown for the sake of simplicity. In this case, a cleaning system 100 is provided for each individual milking parlor, so that the respective process fluids can be discharged immediately before and/or after a milking process. According to other embodiments, the animal accommodation area 181 is an area where no milking process is carried out, but where e.g. a treatment takes place before and/or after a milking process or at some other moment in time.

In the embodiment shown, the cleaning system 100 comprises the positioning unit 120 including at least a basic unit 123, which is mechanically fixed to the accommodation area 181 and which, if necessary, also comprises additional components, such as electronic control components and the like. In addition, mechanical components 122 are provided, e.g. in the form of hinges and the like, so that the fluid dispensing device 110 can be moved relative to the basic unit 123 by means of suitable actuators 121. In the embodiment shown, the fluid dispensing device 110 has a dispensing arm 111, whose length and shape are configured such that, e.g. by a single movement, the fluid dispensing device 110 can be moved from the first operating position 101, at which the accessibility to the teats 184 is maintained and which is shown in FIG. 1b, to a second operating position, indicated by 102 in FIG. 1c. A suitable length and shape of the dispensing arm 111 depend on the circumstances in the animal accommodation area 181. According to some embodiments, the shape and the length of the arm 111 are variable so as to allow a higher degree of flexibility for the use of the cleaning system 100 in connection with differently configured accommodation areas 181.

The actuators 121 may be arbitrary, well-known components, such as pneumatic cylinders, hydraulic cylinders, electric motors and the like, which are controlled by suitable components of the basic unit 123. Since such components are known per se, a more detailed description is not given in this respect.

In the embodiment shown, a discharge nozzle 115, which establishes a well-defined dispensing region for the process fluids, is additionally provided, a suitable determination of the dispensing region, e.g. the amount of process fluid discharged, the ejection angle and the like, being also possible through process parameters, e.g. the pressure of the process fluid in question. Furthermore, adequate dispensing lines 112, 113, 114 are provided, in which the respective process fluids 132, 133 and 134 are conveyed from respective sources, which are jointly designated by 130, along the dispensing arm 111 to the nozzle 115. This means that in this embodiment each process fluid is provided with a dispensing line of its own that ends in the nozzle 115, which represents e.g. a common dispensing region for all process fluids or in which the respective regions for discharging a single process fluid are provided in an individually partitioned manner. The source 130 comprises suitable means 125 for guiding the respective process fluid in a controllable manner via the dispensing line in question to the end region or nozzle 115. For example, the individual process fluids may be stored under pressure in suitable containers or compartments of a single container, so that, when the respective component 125, e.g. in the form of a valve, is actuated, the process fluid will be introduced in the dispensing line in question. It is also possible to use valve units in which the decrease in pressure can be adjusted, so that, even in the case of varying pressure conditions in the respective containers, predetermined pressure conditions will nevertheless be accomplished in the downstream dispensing line.

In other embodiments, the pressure in the respective containers is kept on a constant level so that the pressure conditions prevailing in the dispensing line in question are always the same. A precisely controlled adjustment of the ejection amount as well as of the ejection period and the ejection rate can thus be achieved through the opening time and/or the opening diameter of the respective valve units.

In some embodiments, a device 116, e.g. in the form of a valve, is provided on the nozzle 115 or at the end of each dispensing line, so as to prevent an escape of the respective process fluid residues when the fluid dispensing device 110 is at the first operating position 101. To this end, a simple mechanical valve arrangement may be used, so that it will not be necessary to provide other components on the dispensing arm 111.

In other embodiments, the components 135 in the source 130 are provided in the form of pumps by means of which the pressure and the amount of process fluid can be adjusted in a controllable manner, so that it is thus also possible to create precisely defined conditions for wetting the teats 184. The pumps may here be configured such that, after the end of fluid discharge, fluid residues can also be sucked back, so that an escape of the residues in the case of a change in position of the fluid dispensing device 110 will be avoided to a large extent. Such a use of pumps for conveying the respective process fluids is particularly advantageous in embodiments where a single dispensing line is provided in the fluid dispensing device 110, so that unnecessary contacting of the individual process fluids in the single dispensing line will be avoided. Reference should be made to the fact that a single dispensing line is not shown in the figure, but that this may, substitutionally, be one of the lines 112, 113, 114, which is connected simultaneously to two or more of the individual containers in the source 130.

Figure 1C:
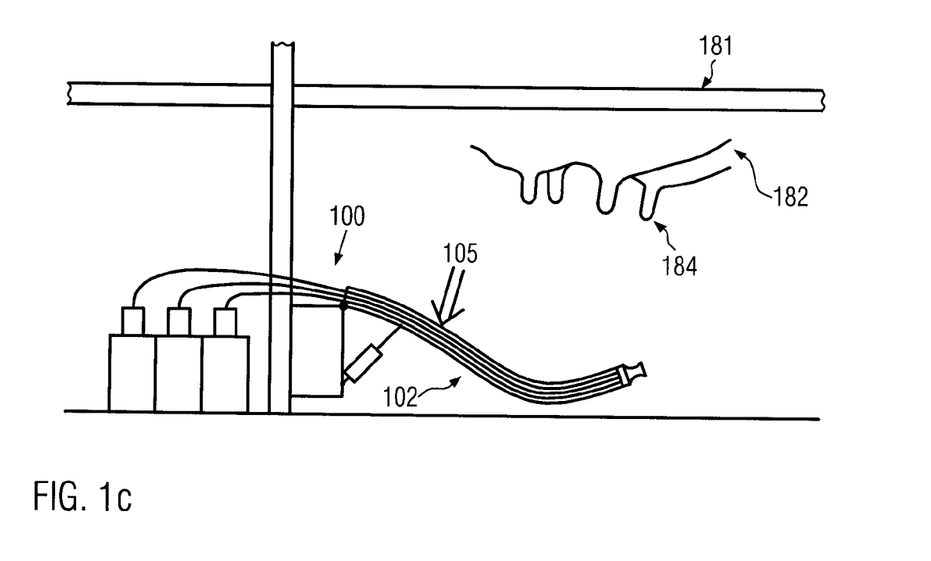
FIG. 1c shows schematically the milking parlor, when the cleaning system for the teats occupies a second operating position for applying a first and/or a second process fluid to the teats.

FIG. 1c shows a cleaning system 100, when the fluid dispensing device 110 occupies the second operating position 102 at which the teats 184 can efficiently be acted upon by one or a plurality of the process fluids. Furthermore, the cleaning system 100 according to the embodiment shown is configured such that, when an external force 105 acts on one of the components, in particular on the fluid dispensing device, a change in position is carried out so as to avoid permanent damage to the cleaning system 100 to the greatest possible extent. As has already been explained hereinbefore, the respective actuators may, to this end, be configured or controlled such that a change in position takes place under the impact of the force 105, provided that the latter exceeds a predetermined threshold value, so that a certain degree of "yielding" is accomplished. In other cases, one or a plurality of springs is provided, so as to hold the fluid dispensing device in position but nevertheless allow an evasive movement under the impact of the force.

Figure 1D:
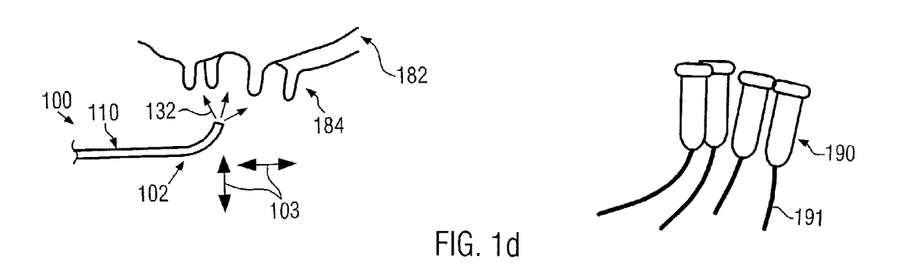
FIG. 1d to 1f show schematically a sequence of steps in the use of the cleaning system during a milking process, where the first process fluid is applied before the milking process and the second process fluid is applied after the milking process so as to minimize contamination between different animals and maintain animal health and consequently the yield of the individual animals on a high level.
Figure 1E:
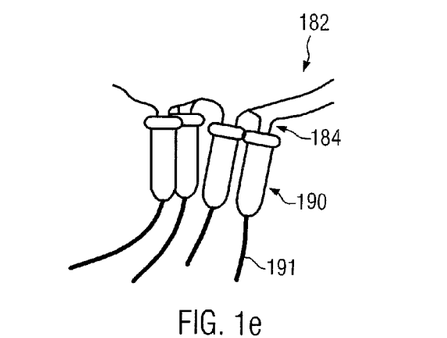
Figure 1F:
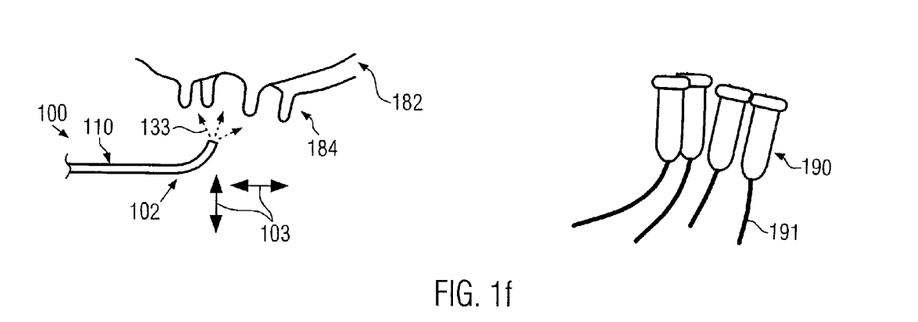

FIG. 1d to 1f show a sequence of different operating conditions during use of the cleaning system 100, when two different types of process fluids are discharged from the latter.

FIG. 1d shows the situation in which the animal 182 is to be treated by wetting the teats 184 with the process fluid 132 before a milking process. In the embodiment shown, it is assumed that the cleaning system 100 is arranged directly at the milking parlor, so that, after treatment through the system 100, it is not necessary to accomplish a change in position of the animal 182, as has been explained hereinbefore e.g. with respect to FIG. 1a. In other embodiments, the treatment through the system 100 may be carried out in a separate animal accommodation area, whereupon the animal 182 moves to a suitable milking parlor for the actual milking process.

In the embodiment shown and in the operating condition in question, the fluid dispensing device 110 occupies the second operating position 102 at which additional movements are, however, possible, as indicated by 103, so as to accomplish the most efficient possible wetting of the teats 184 with the fluid 132 without discharging an undesirably large amount. In this phase, it may perhaps be necessary that the teats are additionally acted upon manually by an operator in that the teats are e.g. rubbed or treated in some other way. It may also be suitable to discharge in this phase a further process fluid, e.g. air, nitrogen or the like, so that, after having been wetted, the teats 184 will be dried and the like.

FIG. 1e shows the animal 182 at a later moment in time, which, according to an advantageous embodiment, follows immediately after the situation shown in FIG. 1d, teat cups 190 being now applied to the teats 184 so as to suck off milk via respective lines 191 by means of said teat cups 190. Due to the efficient and at least partially automated pretreatment of the teats 184 through the process fluid 132, a high hygienic standard is accomplished during the actual milking process, since contamination of the teat cups 190 during the milking process is substantially reduced.

FIG. 1f shows schematically the animal 182 at a later moment in time, i.e. after the end of the actual milking process and after the removal of the teat cups, the teats 184 being now wetted with the second process fluid 133 for the purpose of aftertreatment, said second process fluid 133 ensuring an adequate disinfection and/or aftertreatment of the teats after the milking process. It will be of advantage when the wetting with the process fluid 133 takes place immediately after the milking process. This will be possible when the cleaning system 100 is arranged directly at a respective milking parlor, as has already been explained hereinbefore. According to other embodiments, the aftertreatment is carried out by means of the cleaning system 100 and the process fluid 133 in a special animal accommodation area to which the animal 182 moves after the end of the milking process.

Figure 2A:
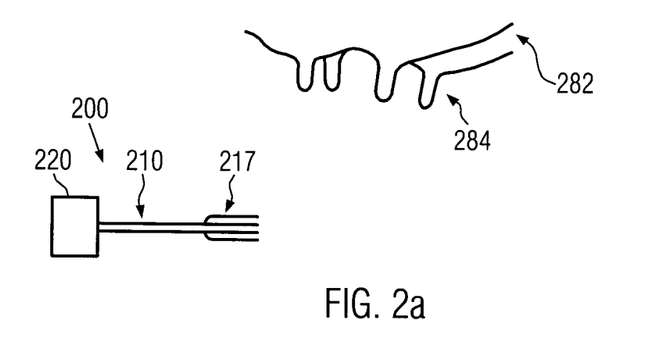
FIGS. 2a to 2c show schematically various embodiments of the fluid dispensing device for illustrating the variety of possible designs.

FIG. 2a shows schematically a cleaning system 200 for teats 284, which, in principle, has a structural design corresponding to that described above in connection with the cleaning systems 100, 100A, . . . 100F. Other than in the case of the above-described cleaning systems, the system 200 comprises, in addition to the positioning unit 220, the fluid dispensing device 210 in a form in which a larger discharge area is accomplished by providing individual discharge nozzles (not shown), which can be extended and thus differently positioned by means of a mechanical unit 217.

Figure 2B:
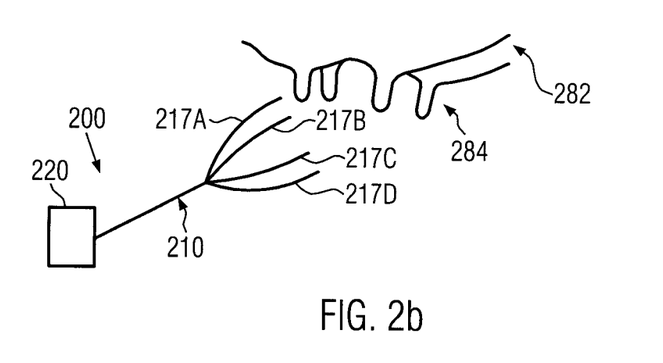

FIG. 2b shows in this respect the system 200 in a condition where the fluid dispensing device 210 occupies the second operating position, so that individual dispensing lines or nozzles 217A, . . . , 217D of the previously "closed" unit 217 (cf. FIG. 2a) are now unfolded, whereby the process fluids can, in total, be discharged more accurately, without the necessity of moving the fluid dispensing device 210 in its entirety across a plurality of positions.

Figure 2C:
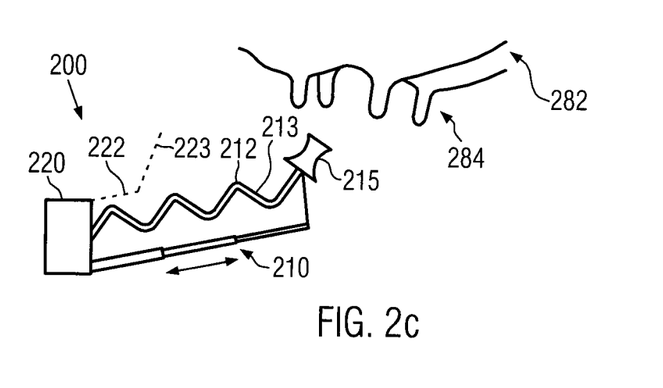

FIG. 2c shows schematically the system 200 according to a further embodiment, in the case of which e.g. also the length of the fluid dispensing device 210 is variable, so that a suitable second operating position can be assumed. To this end, e.g. the dispensing lines 212, 213 may have an adequately flexible design so as to allow the fluid dispensing device 210 to vary in length. In addition, also an adequate angular position of the fluid dispensing device 210 may be imaginable, so that almost any position in the vicinity of the teats 284 can be accessed by means of the positioning unit 220. As shown, a housing 222 may possibly be provided, said housing 222 accommodating the fluid dispensing device 210 at the first operating position, so as to protect the same against mechanical impacts and contamination. Also a suitable closure lid 223 may e.g. be provided, so that the fluid dispensing device 210 can be enclosed completely. If necessary, suitable cleaning components (not shown) may be provided in the housing 222 for removing possible external contaminations or dirt from the fluid dispensing device 210. For example, rinsing may be carried out at regular intervals or in case of need, so as to substantially avoid permanent contamination of the fluid dispensing device 210. It should, however, be pointed out that, due to the contactless treatment of the teats 284 through the cleaning system, an external contamination, in particular of the fluid dispensing device 210, is not very critical. Since, in addition, an ingress of contamination or dirt into the interior of the fluid dispensing device 210 is almost impossible due to the repeated discharge of the process fluids, it is also very unlikely that contamination from one animal to the next will be caused by the fluid dispensing device 210. However, an additional discharge of process fluid, e.g. of a special cleaning fluid, may be effected, if contamination should occur, or at regular intervals, said process fluid being discharged e.g. in the first operating position and collected in a suitable container, if necessary.

The configurations of the fluid dispensing device depicted in FIGS. 2a to 2c are only shown by way of example for illustrating that a large number of different possibilities exist, which allow the at least two process fluids to be provided, without direct contact with the teat, in close vicinity to the teat in such a way that well-defined wetting is possible. Suitable embodiments are in particular also those in the case of which movement can take place, at least in the vicinity of the teats, along a fixedly predetermined curve, so as to accomplish the most efficient possible wetting of the teats. To this end, a cam disk or a cam profile, which enforces a mechanically predetermined path at least in the vicinity of the teats, can be used in the positioning unit 220. This path is here also referred to as the at least one second position. The first or second process fluid may here be discharged continuously in the vicinity of the teats or only at discrete moments in time during the movement along the path. In other embodiments, a suitable path corresponding to a plurality of second positions is accomplished through control by means of a control unit.

Figure 3:
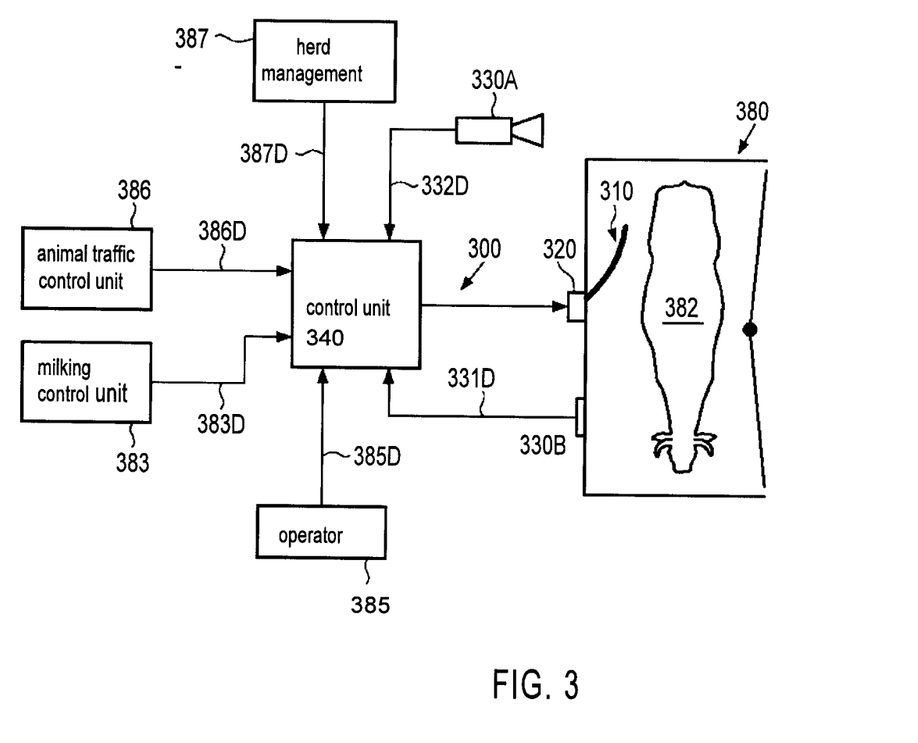
FIG. 3 shows schematically part of the operational environment, where the cleaning system is provided with a control unit, which controls the fluid dispensing device and/or the positioning of the fluid dispensing device on the basis of various input data and signals.

FIG. 3 shows schematically a part of an operational environment 380 used for milk production. For the sake of simplicity, only a single animal accommodation area 381 is shown, which also serves to carry out a milking process according to preferred embodiments, as has also been explained hereinbefore. In other embodiments, the animal accommodation area 381 is a special area that only serves the purpose of animal treatment before and/or after a milking process, a milking process being, however, not carried out in said area itself. To this end, a cleaning system 300 is provided, which, in principle, has a structural design corresponding to that described hereinbefore in connection with the systems 100 and 200 and which thus comprises a positioning unit 320 and a fluid dispensing device 310. In addition, a control unit 340 is provided for the cleaning system 300, said control unit being operationally connected to the fluid dispensing device 310 and/or the positioning unit 320 so as to control the discharge of the first and/or second process fluid and/or the positioning of the fluid dispensing device 310 on the basis of one or of a plurality of control processes implemented in the control.

According to one embodiment, the control unit 340 has supplied thereto image data 332D from an image pickup device 330A, said image data 332D comprising e.g. information with respect to the position of an animal 382 within the animal accommodation area 381 and/or information with respect to the condition of the animal 382, in particular as regards the animal's teats, and the like. The image pickup device 330A is here suitably positioned with respect to the animal accommodation area 381, so as to produce the desired image data. As has already been explained exemplarily, the device 330A may be arranged above the accommodation area 381, so that the animal 382 is imaged from above for producing position data in this way. According to advantageous embodiments, a distinctive reference position is here identified in the animal 382, so that this reference position can then precisely be correlated with the animal accommodation area 381. This, however, means that also the exact position of the animal 382 in relation to the cleaning system and, in particular, the fluid dispensing device 310 is given. The image data 332D can be evaluated especially in connection with animal-specific data 387D provided e.g. by a herd management system 387, to allow thus an even more precise positioning of the fluid dispensing device 310 by means of the control unit 340. The animal-specific data 387D may, by way of example, comprise information on the exact position of the teats with respect to a reference position of the animal 382 so that, on the basis of the determined reference position of the animal 382, also the exact position of the teats within the animal accommodation area 381 is known or can be calculated.

According to other embodiments, the image pickup device 330A is e.g. positioned such that the teats of the animal 382 are directly accessible for optical image evaluation so that also the exact positions of the teats can thus be ascertained in relation to suitable reference positions within the animal accommodation area 381. Suitable position data in the form of data 331D can also be obtained from another positioning system 330B, which may be part of the system 300 and which includes suitable sensors that determine e.g. the distance between two or more points on the body of the animal 382 in relation to the animal accommodation area 381. To this end, many sensor units are available, which are known per se and which can be coupled to the control unit 340 in a suitable manner, e.g. via wired bus connections, wireless interfaces and the like.

In addition, the control unit 340 may possibly also be connected to an animal traffic control unit 386, which provides adequate data 386D that can be evaluated e.g. by the control unit 340 for optimizing especially the discharge of the respective process fluids. For example, the preparation of the cleaning system 300 can be controlled depending on the period of time within which entrance of the animal 382 into the animal accommodation area 381 is predicted by the control unit 386. In this way, it can be guaranteed with high probability that the system 300 will always be in a ready-to-operate state as soon as an animal 382 is to be treated in the animal accommodation area 381.

In addition, a milking control unit 383 may provide data 383D suitable for processing in the control unit 340 so that especially also the discharge of the process fluids can be controlled in this way. For example, the milking control unit 383 may possibly announce via the data 383D the end of a milking process to the control unit 340 so that, in response thereto, a desired process fluid will be provided at the teats of the animal 382 in an automated manner. The milking control unit 383 may also provide additional information, e.g. information on the dropping of a teat cup during the milking process, so that the control unit 340 may possibly cause an adequately adapted sequence of operations of the subsequent cleaning process or treatment process. For example, a process fluid may then be applied more intensively, since, when a teat cup has dropped and has thus come into contact with the floor and when said teat cup has been reapplied, this may possibly lead to a higher risk of contamination of the teat.

The control unit 340 may also receive from an operator 385 data or control signals 385D, which are provided e.g. via a wired or a wireless connection. The data 385D may e.g. cause the control unit 340 to trigger or delay a respective process for dispensing a process fluid, e.g. since there is a delay in the time of arrival of the operator at the animal accommodation area 381.

The control unit 340 is typically provided in the form of a processor, in which respective control algorithms are stored in the form of program instructions in a suitable storage medium. When executed in the processor, these program instructions lead to a realization of the respective algorithms. For example, suitable image processing processes are implemented in the control unit 340, in which the image data 332D are adequately processed for extracting the desired information, unless said image data 332D have already been subjected to adequate preprocessing in the image pickup device 330A. In this respect, well-established image evaluation methods may be used, in which e.g. distinctive image contents are identified and used e.g. for producing suitable position data. In a similar way, suitable data processing processes may be stored, which operate on the basis of the data 331D, 387D, 386D, 383D and 385D, for producing therefrom the data required for controlling the discharge of the process fluids and/or the control of the positioning unit 320. The control unit 340 may, together with one or a plurality of other control units, be implemented in a jointly used arithmetic unit, the connection to the fluid dispensing device 310 and the positioning unit 320 being established by a suitable bus connection or a wireless transmission channel. The control unit 340 may also communicate as a stand-alone control unit with other control components via suitable interfaces for receiving the necessary data.

The present invention thus provides a cleaning system for teats of dairy animals, which discharges at least two process fluids separately and in a controlled manner, so that an efficient sequence of milking process operations is made possible for a large number of animals. The process fluids discharged in the cleaning system are typically different fluids, e.g. a liquid which serves to dissolve or soften firmly adhering contaminations, in particular prior to the actual milking process, and a liquid which is preferably used for the aftertreatment of the teat after a milking process, this being also known as "dipping".

The invention claimed is:

1. A cleaning system for teats of a dairy animal milked with teat cups, comprising:
   teat cups;
   a fluid dispensing device, which is adapted to be attached to an animal accommodation area for accommodating the dairy animal before, during or after a milking process, and which is configured to discharge a first process fluid and a second process fluid separately of one another; and
   a positioning unit coupled to the fluid dispensing device, wherein the fluid dispensing device includes a dispensing arm, which is positioned by the positioning unit at least at a first operating position in which the dispensing arm is capable of allowing access to the teats, and at least at a second operating position, in which the teats are capable of being acted upon by the first or second process fluid, wherein the second operating position is separate from the location of the teat cups sufficient to prevent contamination which may adhere to the teats of a dairy animal from coming into contact with an interior of said teat cups.

2. The cleaning system for teats according to claim 1, wherein the fluid dispensing device comprises a first dispensing line which is connectable to a source for the first process fluid in a controlled manner, and a second dispensing line which is connectable to a source for the second process fluid in a controlled manner.

3. The cleaning system for teats according to claim 1, wherein the fluid dispensing device comprises a dispensing line which is connectable to a source for the first process fluid and a source for the second process fluid in a controlled manner.

4. The cleaning system for teats according to claim 1, wherein said fluid dispensing device is capable of dispensing the first process fluid before the teat cups are attached and the second process fluid after the teat cups have been removed.

5. The cleaning system for teats according to claim 1, wherein the fluid dispensing device further comprises:
   a third process fluid, which serves to reduce the surface wetting of a teat, whereby the teat is dried.

6. The cleaning system for teats according to claim 1, further comprising an animal accommodation area provided for carrying out the milking process.

7. The cleaning system for teats according to claim 1, further comprising:
   a control unit receiving animal-specific data and image data of a position of a dairy animal, said control unit coupled to the positioning unit and controlling a position of the fluid dispensing device and the discharge of the first and second process fluids,
   wherein a position of the fluid dispensing device and the discharge of the first and second process fluids are controlled by the control unit using the animal-specific data and the image data
   whereby the fluid dispensing device is capable of being positioned and the first and second process fluids discharged for cleaning teats of a dairy animal without direct contact by the fluid dispensing device.

8. A cleaning system for teats of a dairy animal milked with teat cups comprising:
   teat cups;
   a fluid dispensing device, which is adapted to be attached to an animal accommodation area for accommodating the dairy animal before, during or after a milking process, and which is configured to discharge a first process fluid and a second process fluid separately of one another;
   a positioning unit coupled to the fluid dispensing device, wherein the fluid dispensing device includes a dispensing arm, which is positioned by the positioning unit at least at a first operating position in which the dispensing arm is capable of allowing access to the teats, and at least at a second operating position separate from a location of the teat cups, in which the teats are capable of being acted upon by the first or second process fluid, and
   drive means for moving the dispensing arm at least temporarily away from the second operating position, when a threshold value of a mechanical impact acting on the dispensing arm is exceeded.

9. A cleaning system for teats of a dairy animal milked with teat cups, comprising:
   teat cups;
   a fluid dispensing device, which is adapted to be attached to an animal accommodation area for accommodating the dairy animal before, during or after a milking process, and which is configured to discharge a first process fluid and a second process fluid separately of one another; and
   a positioning unit coupled to the fluid dispensing device, wherein the fluid dispensing device includes a dispensing arm, which is positioned by the positioning unit at least at a first operating position in which the dispensing arm is capable of allowing access to the teats, and at least at a second operating position separate from a location of the teat cups, in which the teats are capable of being acted upon by the first or second process fluid;
   a control unit receiving animal-specific data and image data of a position of a dairy animal, said control unit coupled to the positioning unit and controlling the position of the fluid dispensing device and the discharge of the first and second process fluids,
   wherein a position of the fluid dispensing device and the discharge of the first and second process fluids are controlled by the control unit using the animal-specific data and the image data, and
   wherein the positioning unit moves the fluid dispensing device to the second operating position using the image data or the animal-specific data.

* * * * *